(12) United States Patent
Wahlen et al.

(10) Patent No.: US 8,399,793 B2
(45) Date of Patent: Mar. 19, 2013

(54) METHODS AND MATERIALS FOR HARD-FACING

(75) Inventors: Patrick Wahlen, Jupiter, FL (US); Robert Dempsey, Pewaukee, WI (US)

(73) Assignee: Lincoln Global, Inc., City of Industry, CA (US)

( * ) Notice: Subject to any disclaimer, the term of this patent is extended or adjusted under 35 U.S.C. 154(b) by 686 days.

(21) Appl. No.: 12/573,179

(22) Filed: Oct. 5, 2009

(65) Prior Publication Data
US 2010/0084379 A1    Apr. 8, 2010

Related U.S. Application Data

(60) Provisional application No. 61/103,074, filed on Oct. 6, 2008.

(51) Int. Cl.
*B23K 25/00* (2006.01)
(52) U.S. Cl. ................ 219/76.15; 219/146.32
(58) Field of Classification Search ........ 219/76.15, 219/146.32
See application file for complete search history.

(56) References Cited

U.S. PATENT DOCUMENTS

| | | | |
|---|---|---|---|
| 1,977,128 A * | 10/1934 | Hawkins | 219/146.51 |
| 2,003,019 A * | 5/1935 | Strobel | 219/76.14 |
| 2,709,213 A | 5/1955 | Gibson | |
| 2,962,399 A | 11/1960 | Ruppert et al. | |
| 3,405,247 A | 10/1968 | Hlivka | |
| 4,097,711 A * | 6/1978 | Banerjee | 219/76.15 |
| 4,115,076 A | 9/1978 | Hitzrot, Jr. | |
| 4,226,684 A | 10/1980 | Scherba | |
| 4,242,981 A | 1/1981 | Bernard et al. | |
| 4,472,619 A * | 9/1984 | Ueda et al. | 219/76.15 |
| 4,625,095 A | 11/1986 | Das | |
| 4,745,254 A | 5/1988 | Funk | |
| 4,830,266 A | 5/1989 | Adams, Jr. | |
| 4,837,417 A | 6/1989 | Funk | |
| 4,882,997 A | 11/1989 | Baxter et al. | |
| 5,101,087 A | 3/1992 | Brotz | |
| 5,597,618 A | 1/1997 | Bayer, Jr. et al. | |
| 5,852,272 A | 12/1998 | Amano | |
| 6,124,564 A * | 9/2000 | Sue et al. | 219/121.47 |
| 6,307,178 B1 | 10/2001 | Gierull | |
| 6,414,258 B1 | 7/2002 | Amano | |
| 2005/0014010 A1 * | 1/2005 | Dumm et al. | 428/472 |
| 2006/0006151 A1 | 1/2006 | McMicken | |
| 2008/0236333 A1 * | 10/2008 | MacLeod | 75/255 |

OTHER PUBLICATIONS

Element 6, http://www.e6.com/e6/page.jsp?pageid=4003010 (Syndrill—2 pages), http:///www.e6.com/e6/page.jsp?pageid=400301010 (How it works—1 page), http://www.e6.com/e6/page.jsp?pageid=817 (Applications—4 pages), http://www.e6.com/e6/page.jsp?pageid=40010 (Saw Grit—2 pages), http://www.e6.com/e6/page.jsp?pageid=1601 (Two Contracts Move Closer the Prospect of Single Crystal Diamond Transistors—2 pages), printed from Internet Apr. 10, 2008, 11 pages.

Brett Clanton, Halliburton Looks to Grind Out a Gain, Houston Chronicle, Jun. 3, 2007, 2 pages.

Costa et al., Rapid tooling by laser powder deposition: Process simulation using finite element analysis, Acta Materialia Inc., Published by Elsevier Ltd., Jun. 20, 2005, p. 3987-3999.

(Continued)

*Primary Examiner* — Steven J Fulk
(74) *Attorney, Agent, or Firm* — Hahn Loeser & Parks LLP

(57) ABSTRACT

In a hard facing process, a core material is applied to the base material of an article, which may incorporate metal components. An additive is introduced into a molten puddle generated by the hard facing process. The additive functions to increase the wear resistant capabilities of the hard faced article. In one embodiment, the additive comprises mineral particulates, which may consist of diamond granules.

18 Claims, 9 Drawing Sheets

OTHER PUBLICATIONS

Goswami et al., Laser Cladding of Nickel Based Hardfacing Materials as an Alternative of Stellite, BARC Newsletter, Issue No. 249, 2004, p. 64-70.

Groth, et al., New Innovations in Diode Laser Cladding, The International Congress on Applications of Lasers and Electro-Optics, 2002, 4 pages.

* cited by examiner

```
┌─────────────────────────────────────────────┐
│ PROVIDING A WELDING ELECTRODE OPERATIVELY   │
│     CONNECTED TO AN ASSOCIATED WELDING      │
│                POWER SOURCE                 │
└─────────────────────────────────────────────┘
                      │
                      ▼
┌─────────────────────────────────────────────┐
│ ESTABLISHING A WELDING ARC FOR CREATING A   │
│       MOLTEN PUDDLE WITH RESPECT TO THE     │
│              ASSOCIATED ARTICLE             │
└─────────────────────────────────────────────┘
                      │
                      ▼
┌─────────────────────────────────────────────┐
│     ADDING SUBSTANTIALLY NON-METALLIC,      │
│  CRYSTALLINE PARTICULATES TO THE MOLTEN     │
│  PUDDLE FOR INCREASING THE HARDNESS OF A    │
│            RESULTING WELD BEAD              │
└─────────────────────────────────────────────┘
                      │
                      ▼
┌─────────────────────────────────────────────┐
│      AT LEAST PARTIALLY ENCAPSULATING THE   │
│  SUBSTANTIALLY NON-METALLIC, CRYSTALLINE    │
│      PARTICULATES IN A METALLIC VENEER      │
└─────────────────────────────────────────────┘
```

FIG. 9

METHODS AND MATERIALS FOR HARD-FACING

This utility patent application claims priority to U.S. provisional patent application Ser. No. 61/103,074 filed on Oct. 6, 2008, entitled Methods and Materials for Hard-Facing, which is incorporated herein by reference in its entirety.

TECHNICAL FIELD

The present invention pertains to methods and materials used in hard-facing, and more particularly, to particulates added during the hard-facing process.

BACKGROUND OF THE INVENTION

Metal parts frequently fail their intended use, due not only to fracturing but also to wear and abrasion. Wear changes a metal part dimensionally and as such functionally. Processes are known for repairing worn metal parts where a durable material is adhered to the degraded surface. For metal components, this is commonly known as hard-facing, which can be defined as the application of building up wear-resistant material onto a part's surface by means of welding or joining. Hard-facing bonds a layer of core metal onto a worn component. In the prior art, wear resistant additives, like tungsten, are included to improve durability. The cost of hard-facing is considerably less expensive than replacement costs and since hard-facing can be applied to a variety of base metals like: steel, stainless steel, nickel-based alloys, and copper-based alloys, it is widely used throughout industry today.

BRIEF SUMMARY

The embodiments of the present invention pertain to a welding process, and more particularly, to a hard-facing application using a source of welding power. During the process, wear resistant particulates are applied to a molten weld puddle. The particulates may be applied by the electrode across the welding arc or via a separate deposition process. The particulates embed in the solidified material forming a wear resistant surface capable of withstanding abrasion. The particulates may be comprised of nonmetallic and substantially elemental substances, like for example carbon atoms formed from an isometric lattice structure, more commonly known as diamond.

BRIEF DESCRIPTION OF THE DRAWINGS

FIG. 9 is block diagram of a method of welding according to the embodiments of the subject invention.

DETAILED DESCRIPTION OF THE INVENTION

Figure 1:
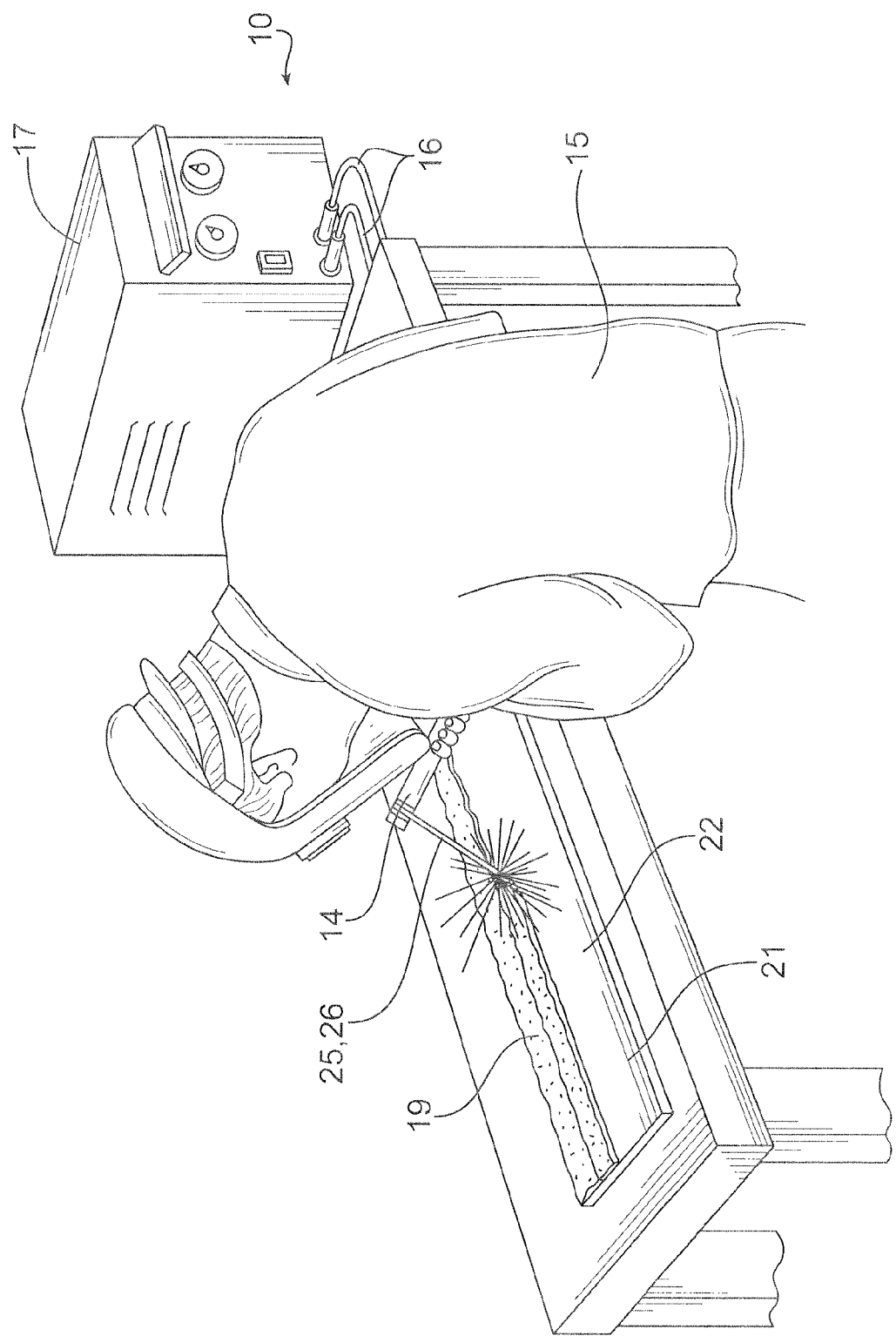
FIG. 1 is a perspective view of a welder hard-facing the surface of a component according to the embodiments of the subject invention.

Referring now to the drawings wherein the showings are for purposes of illustrating embodiments of the invention only and not for purposes of limiting the same, FIG. 1 depicts an end user 15 performing an operation utilizing an arc welder shown generally at 10. In one embodiment, the end user 15, or operator, is applying hard-facing material 19 onto a component 21. Hard-facing may be defined as a process by which core material is adhered to the surface of an existing component. The process bonds or infuses the core material, which may be harder than the component material (also termed base material). In this manner, the core material comprises a wear resistant surface and a barrier to abrasion during use of the component 21. For metal components 21, an arc welding process may be used to apply the core material 19, as will be discussed further below. However, the subject description of arc welding should not be construed as limiting. Rather, other processes and types of equipment may be used, including but not limited to oxyacetylene torches. In this manner, core material 19 is melted along with a surface portion of the metal component 21. The materials 19, 21 coalesce and solidify to create a wear resistant exterior.

Hard-facing may be applied to wide variety of applications. The metal component 21, shown in FIG. 1, is depicted as generally planar for illustration purposes only. It will be appreciated that the embodiments of the present invention are not limited to the shape and/or size of existing metal component 21, or type of material comprising the metal component 21. Examples of such components 21 may include: impeller blades, extrusion screws, and drill bits, just to name a few. Still, the application of the hard-facing may be applied to any component 21, metal or otherwise, as chosen with sound engineering judgment.

As mentioned above, the operator 15 may apply the hard-facing material 19 via a manual welding process and may use stick or finite length electrodes 26. Other methods incorporate more automated processes using continuous-feed electrodes 27, shown in FIG. 2, and programmable equipment like for example articulated robotics. Accordingly, a welding power source 17 may supply electrical power for establishing a welding arc via welding cables 16 and an electrode holder 14 or welding gun 14. Again, persons of ordinary skill in the art will understand the exemplary nature of the presently described process using an arc welding power source 17. It will be appreciated that other types of equipment and processes, like brazing, are to be construed as falling within the scope of coverage of the embodiments of the subject invention.

Figure 2:
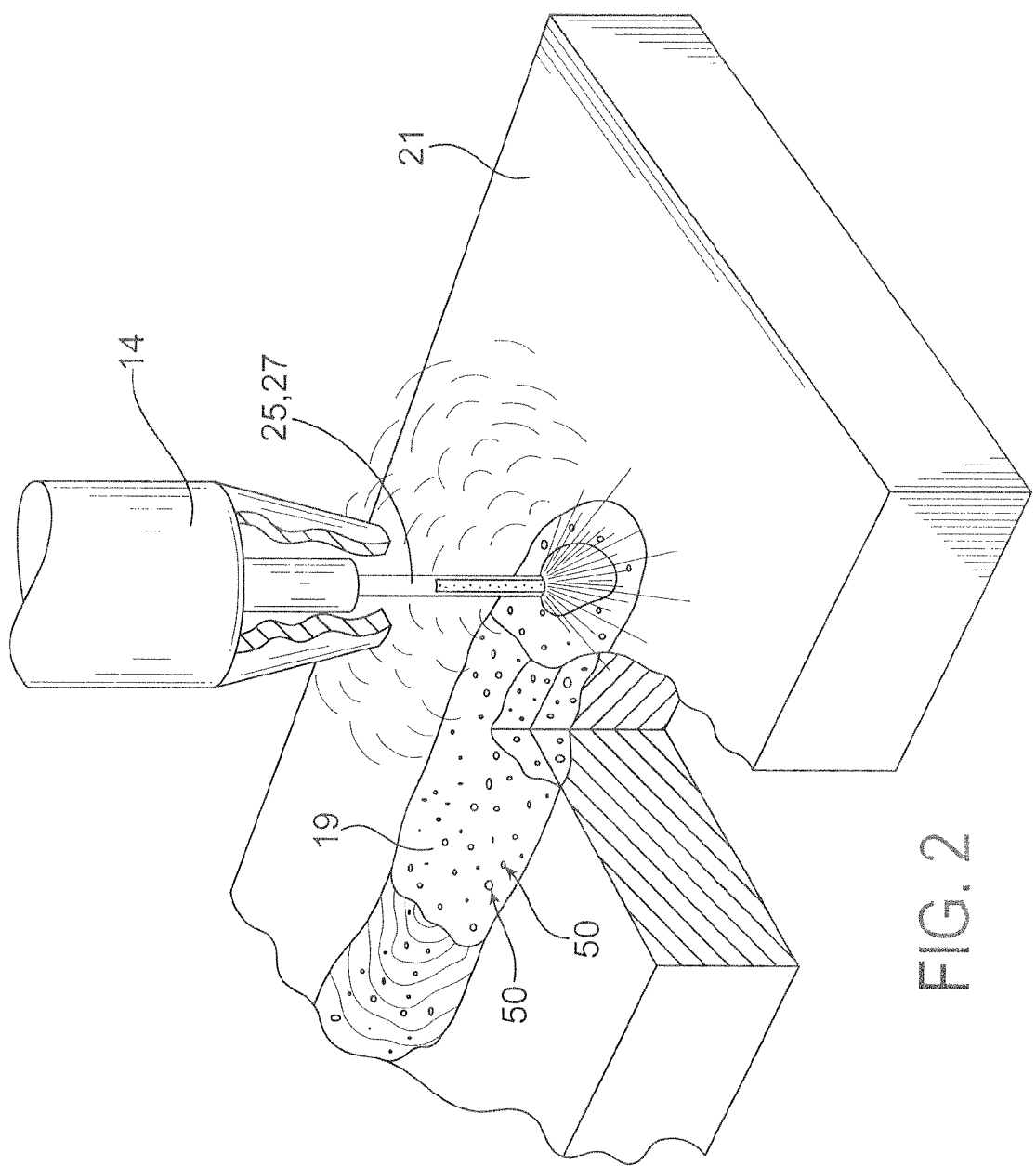
FIG. 2 is a close up of the perspective view of a hard-facing application according to the embodiments of the subject invention.
Figure 3:
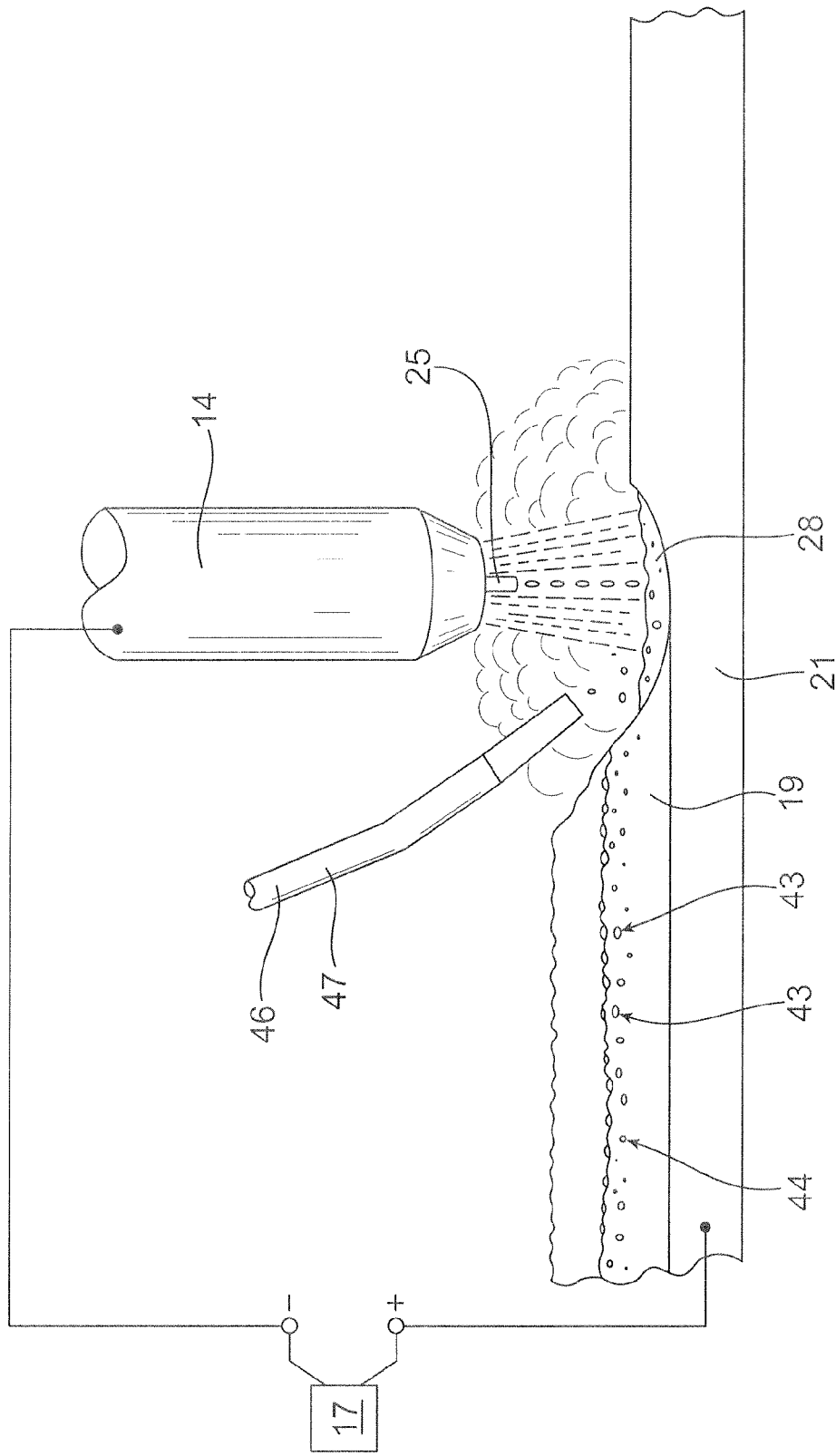
FIG. 3 is a close up of the perspective view of a hard-facing application according to the embodiments of the subject invention.

FIGS. 2 and 3 depict schematic representations of a hard-facing application. In the hard-facing process, an electrode 25 is fed through an electrode holder 14. As previously mentioned, the electrode 25 is utilized to establish a welding arc capable of melting a surface portion of the component 21 to be hard-faced. The hard-facing process deposits a core material 19 of metal, which makes up a part of the electrode 25. The core material 19 may include one or more substances, in this embodiment a metal or metal alloy, chosen for its wear resistant properties and/or for its ability to fuse with the base material of the existing component 21. The core material 19 may be similar in composition to the material comprising the metal component 21 for effective bonding of the materials 19, 21. However, it is noted that any type of core material 19 may be chosen as is appropriate for use with the embodiments of the present invention. Other materials may also be infused during the hard-facing process, which includes additives that contribute to the hardness and/or wear resistance of the hard faced surface, as will be discussed further in a subsequent paragraph. The electrode 25 may further include fluxing agents and other reagents, which aid the hard facing process, and more specifically which reduce the detrimental effects of ambient conditions. It follows that as the operator 15 directs the electrode holder 14 across the component 21, the electrode 25 is consumed and core material 19 is deposited by the hard-facing process onto the surface of the metal component 21.

Figure 4:
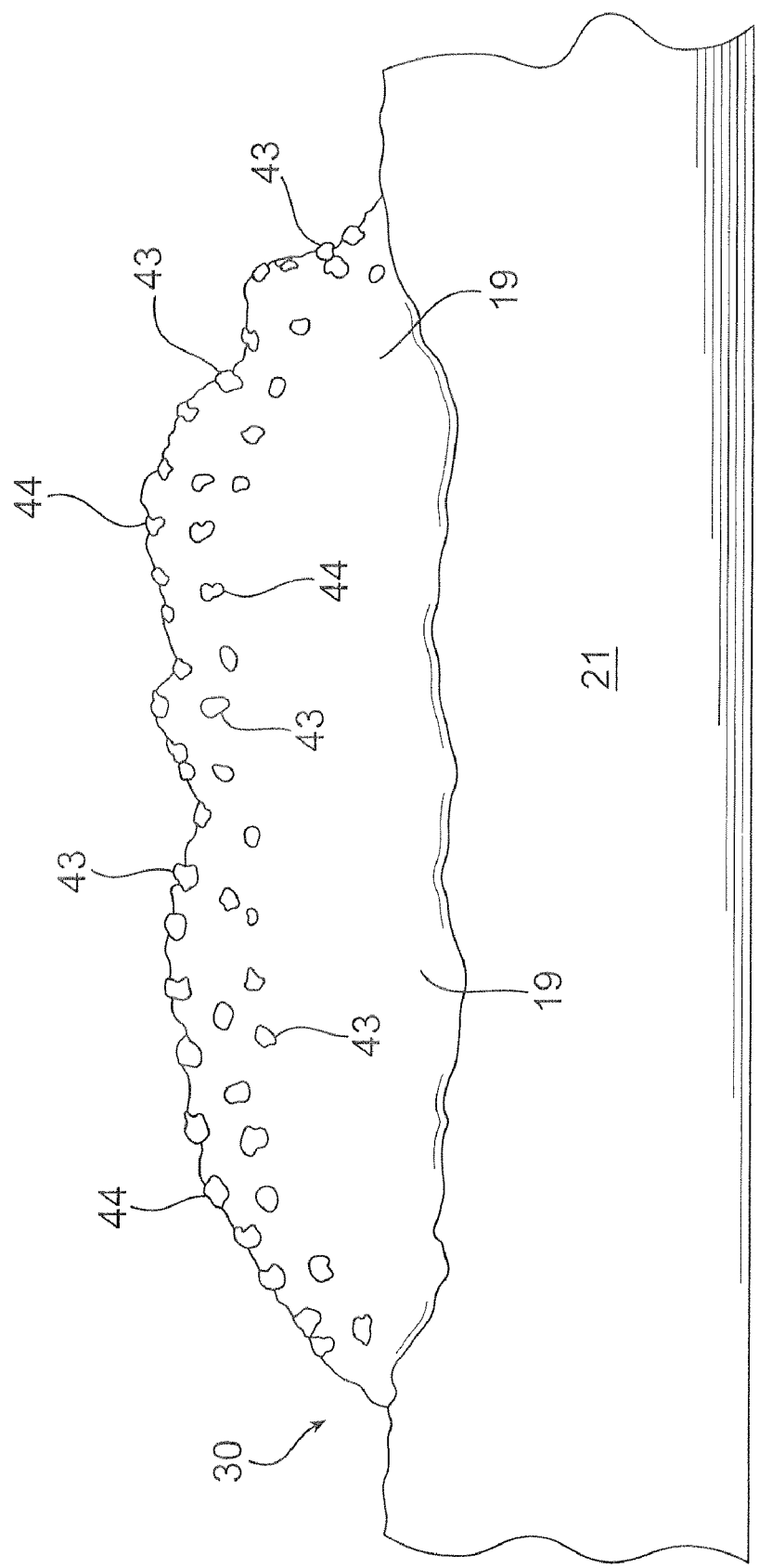
FIG. 4 is a close up, cross sectional view of a hard-facing bead according to the embodiments of the subject invention.

With reference now to FIG. 4, a close up, cross sectional view of a hard facing bead 30 is shown incorporating a plurality of wear resistant particulates 43. In one embodiment, additives may be deposited in the hard facing bead 30 during the application of the hard facing material 19, or core material 19. It will be readily seen that the energy source, e.g. welding arc or torch flame, produces a molten puddle 28 on the surface of the metal component 21, as depicted in FIG. 3. Prior to solidifying, additives may be introduced into the molten puddle 28. Upon cooling, the additives become permanently embedded into the weld bead 30.

With reference again to FIG. 3, in one embodiment the additives, comprised of wear resistant particulates 43, may be introduced into the molten puddle separate from the application of the energy source used to apply the hard-facing material 19. In other words, wear resistant particulates 43 may be added by a delivery system 46 that is separate from the welding gun 14, and associated welding power source 17. The delivery system 46 may incorporate one or more components making up a gravity feed mechanism. A tubular member 47 may be incorporated that directs wear resistant particulates 43 from a feed source, not shown, to a specific point in the molten puddle 28. The tubular member 47 may be adjustable with respect to its position behind the electrode 25. It is noted that the tubular member 47, also termed feed tube, may be positioned at any point spaced apart from the welding arc as is appropriate for allowing the wear resistant particulates 43 to settle into the viscous material of the molten puddle 28. The tubular member 47 that delivers the wear resistant particulates 43 may also oscillate laterally for evenly distributing the particulates across the hard-faced bead 30.

With reference again to FIG. 2, another embodiment is contemplated whereby the wear resistant particulates 43 are introduced into the molten puddle 28 simultaneously with the electrode 25. In this embodiment, wear resistant particulates 43 are transferred through the welding arc along with the hard-facing material 19. The wear resistant particulates 43 may be incorporated into the electrode 25. That is to say that the wear resistant particulates 43 may be integrally fashioned with the welding electrode 25 in either a covering applied to the exterior of the electrode core or packed into the hollow core of a tubular electrode. In any manner, flux and/or other reagents may be incorporated along with the wear resistant particulates 43. Still any manner of introducing wear resistant particulates 43 as transferred across the welding arc may be chosen as is appropriate for use with the embodiments of the subject invention.

Figure 5:
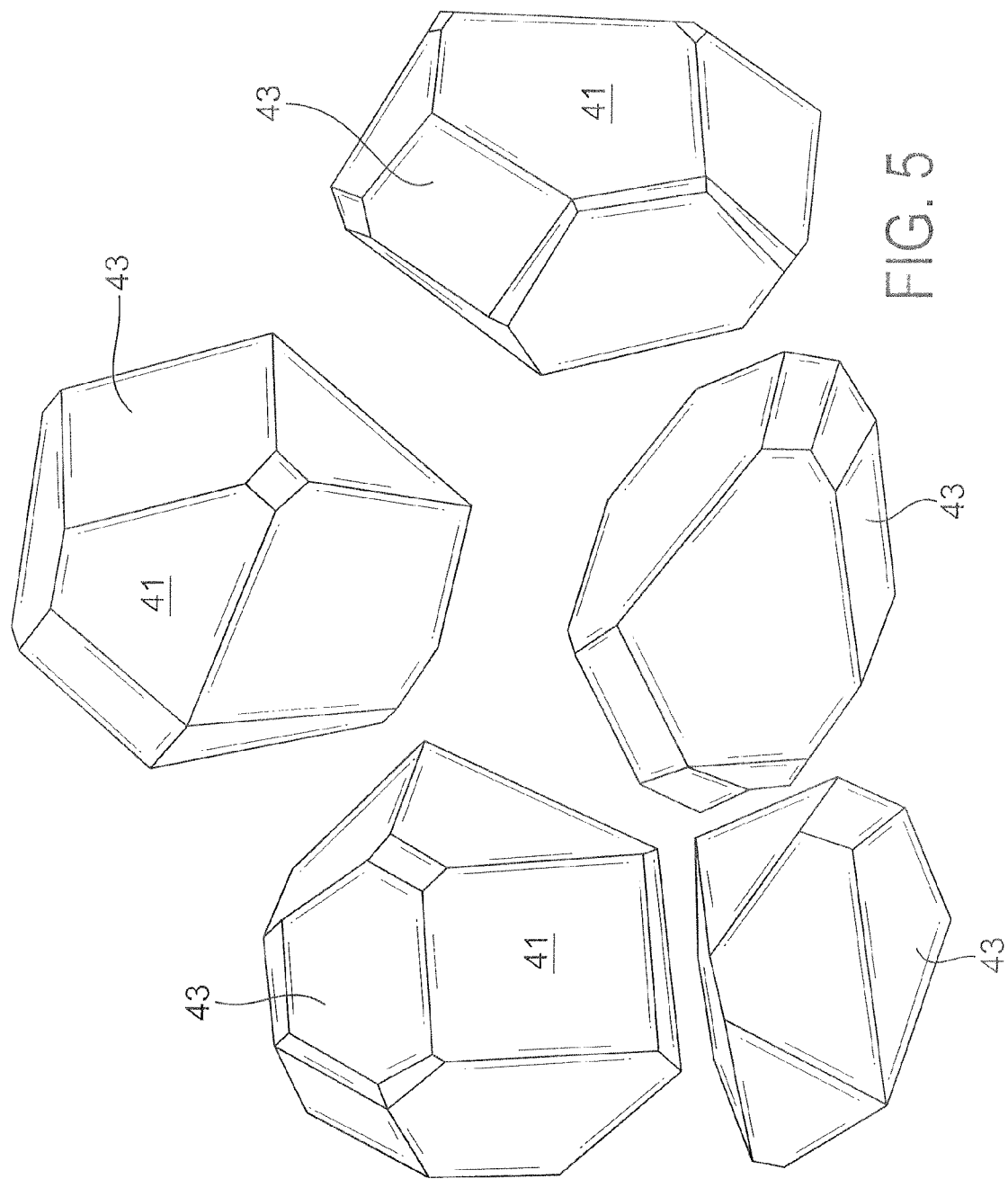
FIG. 5 is a perspective view of wear resistant particulates according to the embodiments of the subject invention.

With reference now to FIG. 5, the wear resistant particulates 43 may be comprised of a mineral substance. It is contemplated in one embodiment that the mineral substance may be substantially nonmetallic in nature; that is to say comprised mostly of elements that are categorized as nonmetallic. The wear resistant particulates 43 may also be substantially elemental in its construct. Additionally, in its solid phase, the mineral substance may be crystalline in nature. More specifically, the microscopic configuration of the crystalline lattice structure may be configured isometrically, which is to say that the lattice structure is arranged in an array of points repeating periodically in three dimensions. In one embodiment, the wear resistant particulates 43 may be comprised mostly of carbon atoms. In this configuration, carbon is more commonly known as diamond. It is known in the art that diamond substances are not necessarily comprised completely or purely of carbon. Rather other elements may be interspersed into the lattice structure like for example nitrogen, which is known to give diamond substances a yellow hue. All such variations are to be included within the scope of coverage of the embodiments of the subject invention.

Other embodiments are contemplated wherein the wear resistant particulates 43 are comprised of mineral substances comprising compounds other than or in addition to carbon. Such mineral substances may similarly have a lattice structure that is isometrically configured. One type of mineral is made substantially from Aluminum Oxide commonly called Corundum. Examples of such wear resistant particulates 43 may include sapphires, rubies and the like. In this manner, the mineral substances may be characterized as gemstones and may be substantially homogenous in configuration. Mineral substances such as those described above may include various quantities of foreign particulates, which may be encased by the lattice structure or incorporated into the lattice structure. All such compounds are to be construed as falling within the scope of coverage of the embodiments of the subject invention.

The wear resistant particulates 43 may be relatively small in diameter ranging in size from approximately 100µ (microns or micrometers) up to and exceeding 800µ (microns or micrometers). More specifically, the wear resistant particulates 43 may be in the range between 400µ (microns or micrometers) to 600µ (microns or micrometers). Still, it is to be construed the wear resistant particulates 43 may be somewhat larger or smaller than the stated ranges. In an exemplary manner, the figures depict generally circular or elliptically shaped particulates. However, the wear resistant particulates 43 may also be elongate or have any shape as is appropriate for use with the embodiments of the subject invention.

Figure 6:
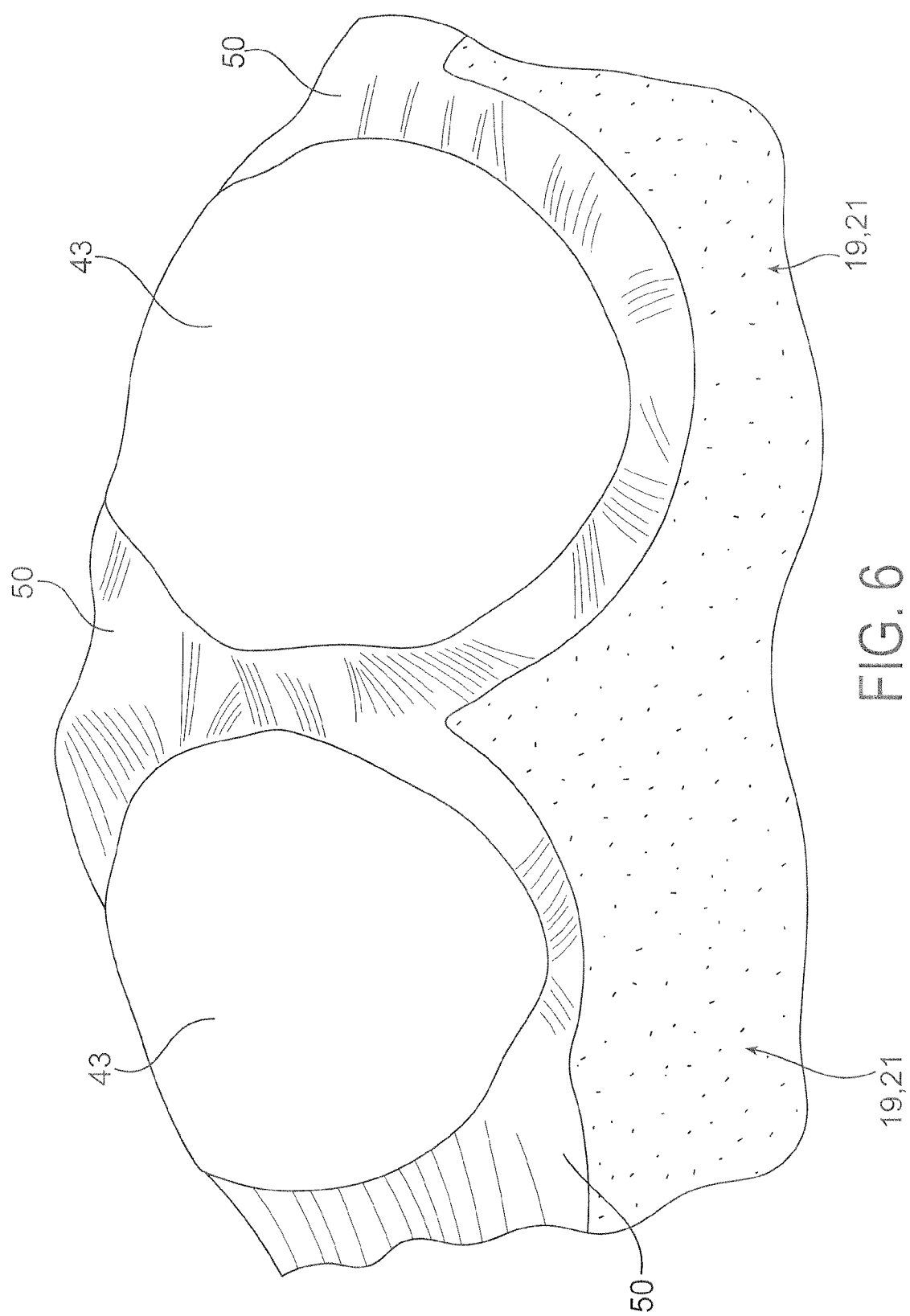
FIG. 6 is a cross sectional view of wear resistant particulates embedded in a substrate according to the embodiments of the subject invention.

Referencing FIGS. 5 and 6, another embodiment is contemplated wherein the wear resistant particulates 43 may be at least partially covered or coated with a veneer 41. The veneer 41, or coating 41, may be comprised of metal or metal alloy. The metal or metal alloy may itself be hard or wear resistant. Additionally, the material comprising the veneer 41 may correspond to the base material 21 and/or the core material 19. That is to say that the material comprising the metallic veneer 41 may effectively blend together with the base material 21 and/or the core material 19 for firmly holding the wear resistant particulates 43 in place. In one example, the veneer 41 is comprised of tungsten or tungsten carbide. The tungsten, once exposed to the energy source of the hard-facing process, melts forming a tungsten carbide substrate 50 within which the wear resistant particulates 43 become embedded. Other embodiments are contemplated wherein the veneer 41 is comprised of cobalt, chromium and/or alloys formed therefrom. Still, the veneer 41 may be comprised of any metal as is appropriate for use with the embodiments of the subject invention.

In one embodiment, the type and/or amount of veneer 41 may be selectively adjusted to change the overall density of the wear resistant particulates 43. In the present example of diamond particulates, it will be understood that the diamonds may be substantially homogeneous having a generally uniform density. As such, the diamond particulates will penetrate only so far into the molten puddle 28 regardless of its girth. To increase penetration into the hard-facing bead 30, the amount of veneer may be thickened thereby increasing the overall density of the particulate 43 allowing it to sink further into the molten puddle 28. In one example, the thickness of the veneer 41 may range from just a micrometer up to 50 micrometers. However, any thickness of veneer 41 may be chosen for the desired depth of penetration into the hard-facing bead 30. It will be appreciated that, in the embodiment utilizing the delivery system 46, the position of tubular member 47 may also affect the depth of penetration of the wear resistant particulates 43. In this manner, the end user 15 may selectively adjust the position of the particulates with the hard-facing bead 30. It is to be realized that different wear resistant particulates 43 may be constructed having different overall veneer thicknesses and hence different densities. When dispersed together, it will be seen that the particulates allow the end-user to populate the hard-facing bead 30 with particles throughout its thickness. Additionally, by adjusting the proportion of lighter and heavier wear resistant particulates 43, the end-user 15 may distribute the wear resistant particulates 43 in any manner suitable for a specific application. All such proportions are to be construed as falling within the scope of coverage of the embodiments of the subject invention.

Figure 7:
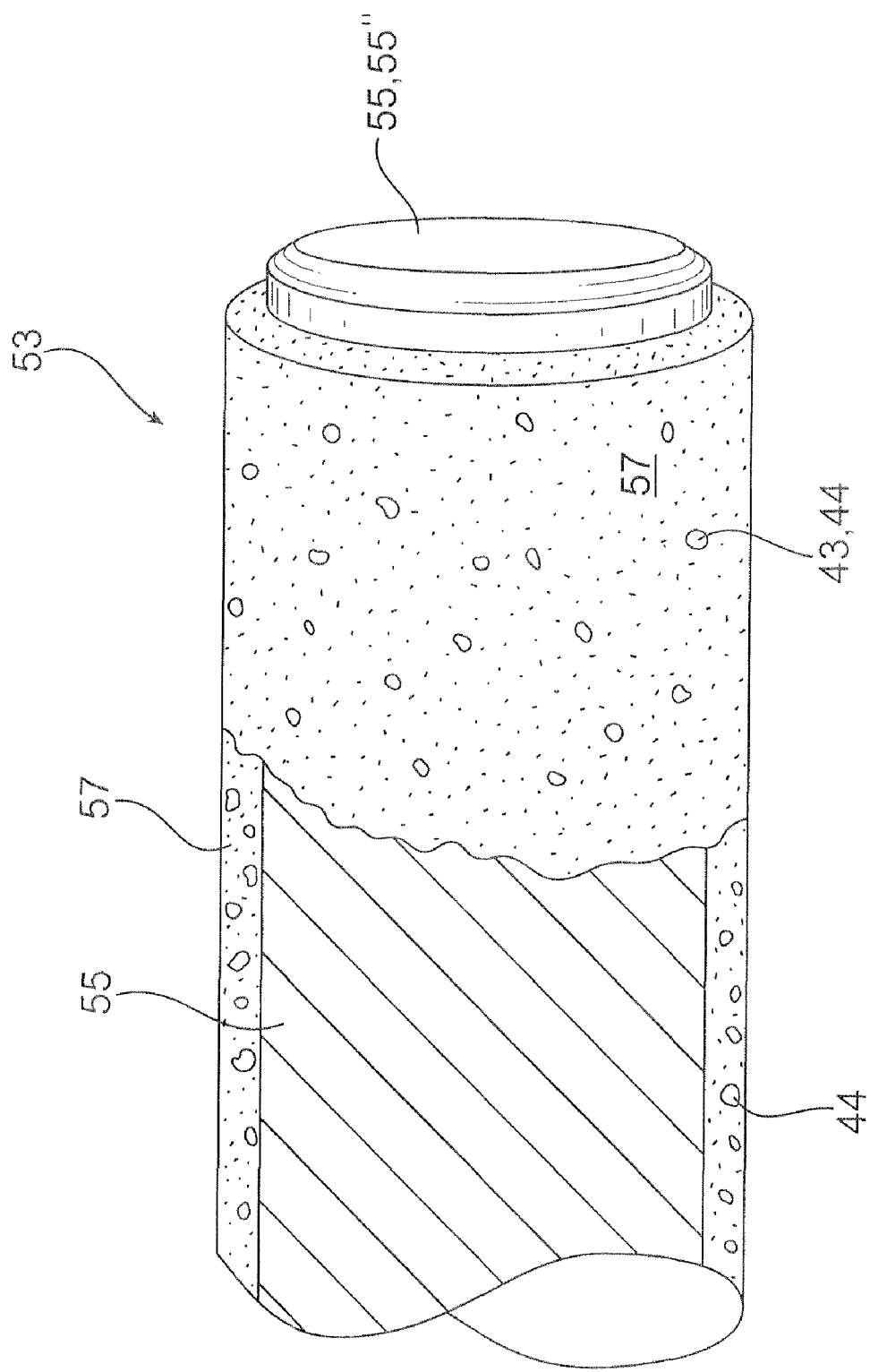
FIG. 7 is a partial cutaway, close up view of an electrode incorporating wear resistant particulates according to the embodiments of the subject invention.
Figure 8:
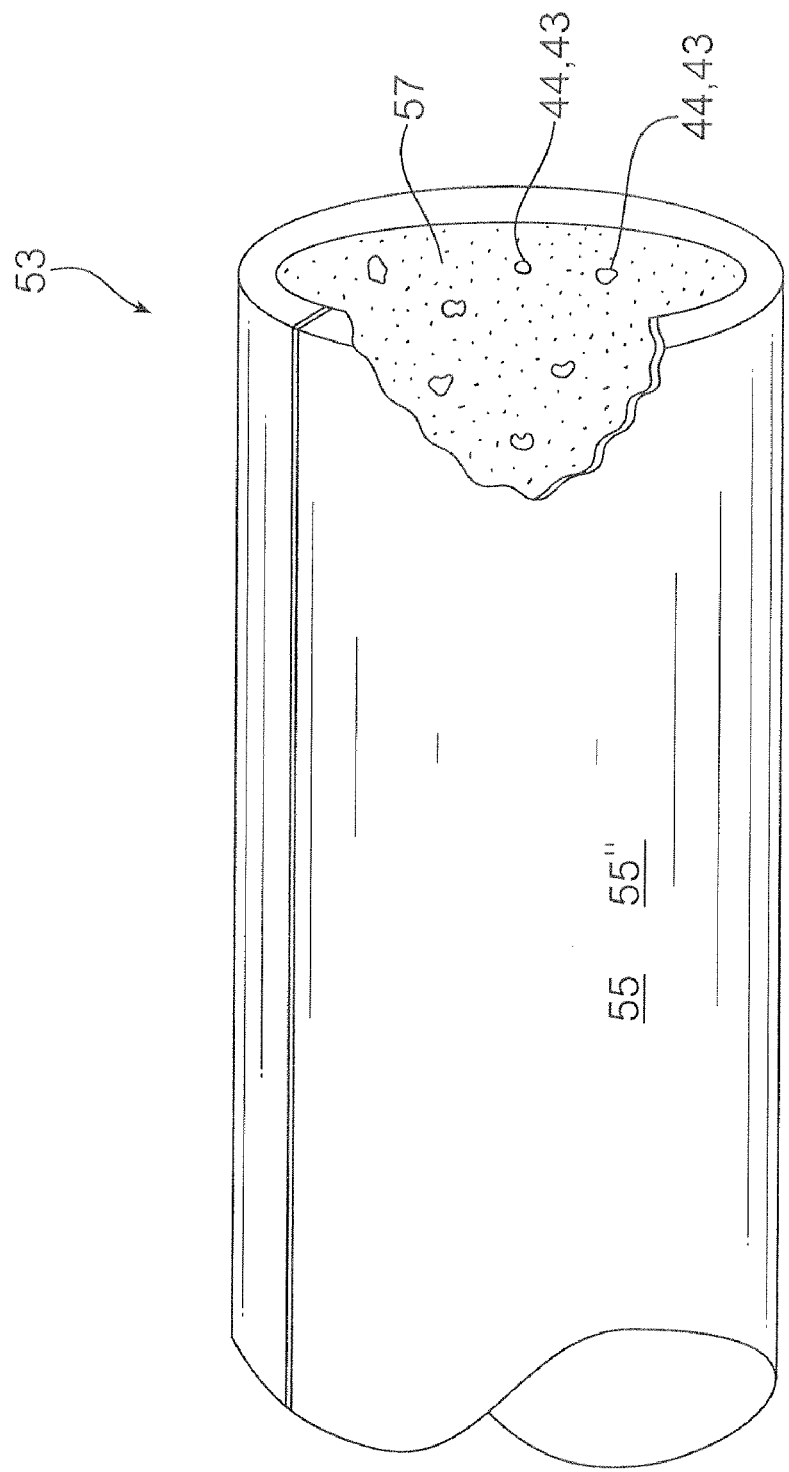
FIG. 8 is partial cutaway, close up view of another electrode incorporating wear resistant particulates according to the embodiments of the subject invention.

With reference now to FIGS. 7 and 8, an electrode 53 is illustrated having a core rod 55, which may include a solid core wire 55' (FIG. 7) or a hollow core wire 55" (FIG. 8). Other types of core rod material are also to be construed as falling within the scope of coverage of the embodiments of the subject invention including but not limited to composite cores, not shown. In a manner consistent with that described above, the core rod 55 comprises the core material 19 mentioned above as used in the hard facing process. As such, the core material 19 may be constructed from Carbon Steel, Cast Iron, Nickel alloys, Copper alloys and the like. However, the core material 19 may be constructed from any metal or metal alloy as is appropriate for a particular application. It is noted that while the subject embodiments discuss a hard facing application, the electrodes described herein may be applied to any type of welding application, hard-facing or otherwise.

The core rod 55 may be surrounded by, or respectively filled with, ingredients that function, for example, to provide corrosion resistance, shielding from ambient conditions and purging of impurities from the molten metal. The ingredients may include metals and minerals for alloying and deoxidizing, for stabilizing the welding arc and for forming protective slag, as well as providing shielding from ambient conditions. In this manner, the core rod 55 may be coated, as shown in FIG. 7, with a covering 57 made of fluxing elements and other reagents, or alternatively filled with core ingredients 58, as shown in FIG. 8, comprised of similar materials. In one embodiment, the wear resistant particulates 43 may be combined with the covering 57 or core ingredients 58. Stated another way, the electrode covering 57 or electrode cored ingredients 58 incorporate diamond particulates 44. It will be readily seen that by integrally fashioning the wear resistant particulates 43 directly into the electrode, the wear resistant particulates 43 may be directly and automatically transferred to the component 21 during application of the hard facing material 19.

With reference to FIG. 9, an embodiment of the hard-facing process will now be described. An end user 15 may establish a connection between the electrode 25, a source of welding power and the work piece, which in the present example comprises component 21. The source of welding power may be an arc welding power source 17 as mentioned above. It is expressly noted that other sources of welding energy may also be used including but not limited an oxy-acetylene torch. Once connected, the operator may strike an arc between the electrode 25 and the component 21 causing welding energy to be applied to the weld site thereby melting the base metal of the component 21 and the core metal of the electrode 25 and subsequently forming a coalescence of material, which may be hard-facing material. In one embodiment, a delivery system 46, separate from the welding equipment, may be incorporated to distribute wear resistant particulates 43 in the initially molten weld puddle 28. In an alternate embodiment, the electrode 25 may contain the wear resistant particulates 43, which as will be seen by persons of skill in the art, will be transferred across the arc into the weld bead.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. An electrode for producing a welding bead on an associated article, comprising:
   a metallic core for coalescing with the base metal of the associated article in the presence of welding energy; and,
   mineral granules juxtaposed to the metallic core, wherein the mineral granules are sized for deposition into welding bead for increasing the surface hardness of the welding bead, said mineral granules having a veneer of different thicknesses affixed to said mineral granules, said veneer-coated mineral granules thereby having different densities and penetrating into said welding bead by varying amounts, thereby allowing said welding bead to contain veneer-coated mineral granules throughout a thickness of said welding bead.

2. The electrode as defined in claim 1, wherein the mineral granules are comprised of:
   diamond granules.

3. The electrode as defined in claim 1, wherein the mineral granules are comprised of:
   corundum granules.

4. The electrode as defined in claim 1, wherein
   the size of mineral granules range from between 100 micrometers to 800 micrometers.

5. The electrode as defined in claim 1, wherein the veneer is metallic and comprised of at least one of:
   tungsten, cobalt or chromium.

6. An electrode for applying a hard facing bead to an associated article, comprising:
   an electrode core comprised of any metal suitable for forming a coalescence of hard facing material with the base metal of the associated article; and,
   non-metallic, crystalline particulates juxtaposed to the electrode core for increasing the wear resistance of the coalescence of hard facing material, said non-metallic, crystalline particulates having a veneer of different thicknesses affixed to said particulates, said veneer-coated particulates thereby having different densities and penetrating into said welding bead by varying amounts, thereby allowing said welding bead to contain veneer-coated particulates throughout a thickness of said welding bead.

7. The electrode as defined in claim 6, wherein at least a portion of the non-metallic, crystalline particulates have an isometrically configured lattice structure.

8. The electrode as defined in claim 6, wherein at least a portion of the non-metallic, crystalline particulates are comprised substantially of carbon.

9. The electrode as defined in claim 6, wherein the non-metallic, crystalline particulates include diamond particulates.

10. The electrode as defined in claim 6, further comprising: a fluxing agent.

11. The electrode as defined in claim 6, wherein the electrode core is a finite length welding electrode, comprising: a generally tubular metal core rod at least partially filled with the non-metallic, crystalline particulates.

12. The electrode as defined in claim 6, wherein the electrode core is a finite length welding electrode, comprising: a generally solid core metal rod at least partially coated with the non-metallic, crystalline particulates.

13. The electrode as defined in claim 6, wherein the electrode is a contiguously formed, continuous feed electrode.

14. A method of welding an associated article, comprising the steps of:
providing a welding electrode operatively connected to an associated welding power source;
establishing a welding arc for creating a molten puddle with respect to the associated article; and,
adding substantially non-metallic, crystalline particulates to the molten puddle for increasing the hardness of a resulting weld bead, said particulates having a veneer of different thicknesses affixed to said particulates, said veneer-coated particulates thereby having different densities and penetrating into said molten puddle by varying amounts, thereby allowing said weld bead to contain veneer-coated particulates throughout a thickness of said weld bead.

15. The method as defined in claim 14, wherein the substantially non-metallic, crystalline particulates are transferred across the welding arc.

16. The method as defined in claim 14, wherein the substantially non-metallic, crystalline particulates are deposited into the molten puddle at a position behind the welding arc.

17. The method as defined in claim 14, wherein the substantially non-metallic, crystalline particulates are formed from minerals having an isometrically configured lattice structure.

18. The method as defined in claim 14, wherein the substantially non-metallic, crystalline particulates are formed from diamond.

* * * * *